(12) United States Patent
DiStasio et al.

(10) Patent No.: US 6,466,841 B2
(45) Date of Patent: Oct. 15, 2002

(54) APPARATUS AND METHOD FOR DETERMINING A REFERENCE POSITION FOR AN INDUSTRIAL ROBOT

(75) Inventors: Christopher C. DiStasio, Rochester, NY (US); Nathaniel E. Haslam, Dublin (IE)

(73) Assignee: Xerox Corporation, Stamford, CT (US)

( * ) Notice: Subject to any disclaimer, the term of this patent is extended or adjusted under 35 U.S.C. 154(b) by 34 days.

(21) Appl. No.: 09/783,336

(22) Filed: Feb. 14, 2001

(65) Prior Publication Data

US 2002/0111709 A1 Aug. 15, 2002

(51) Int. Cl.[7] .......................... G06F 7/00; G05B 19/00; G05B 15/00
(52) U.S. Cl. .......................... 700/213; 901/47; 700/259
(58) Field of Search .......................... 700/213, 214, 700/259, 108, 109, 110, 95; 901/47; 29/720

(56) References Cited

U.S. PATENT DOCUMENTS

| 4,663,658 A | * | 5/1987 | Lanne et al. | 901/47 |
| 4,738,025 A | * | 4/1988 | Arnold | 901/47 |
| 4,770,120 A | * | 9/1988 | Komatsu et al. | 118/500 |
| 5,298,939 A | * | 3/1994 | Swanson et al. | 355/30 |
| 5,898,179 A | * | 4/1999 | Smick et al. | 414/217 |
| 6,040,893 A | * | 3/2000 | Ebinuma | 355/53 |

* cited by examiner

Primary Examiner—Christopher P. Ellis
Assistant Examiner—Gene O. Crawford
(74) Attorney, Agent, or Firm—Fay, Sharpe, Fagan, Minnich & McKee, LLP

(57) ABSTRACT

An imaging reference system is provided for increasing the placement accuracy of an industrial robot system. The system can employ an air bearing assembly for allowing a workpiece holder to move therealong. The imaging reference system can be coupled to the air bearing assembly or integrated into the manipulator.

15 Claims, 5 Drawing Sheets

APPARATUS AND METHOD FOR DETERMINING A REFERENCE POSITION FOR AN INDUSTRIAL ROBOT

BACKGROUND OF THE INVENTION

The present invention relates generally to industrial robot systems used for fabricating components for use in an image forming system, and more particularly, relates to the use of a reference position system with the industrial robot system. 10 Many industrial robot systems utilized to perform precision assembly of electronic devices such as, electronic devices containing multiple Light Emitting Diodes (LED) for use in image forming systems, such as scanners and printers, are capable of achieving a workpiece placement accuracy of between 25 microns and 50 microns. Nonetheless, in a high volume manufacturing setting, the component placement accuracy of the industrial robot deteriorates during use. For example, the stresses associated with repetitive movements cause thermal warming and cooling which significantly impacts the systems placement accuracy. As a result, workpiece placement accuracy of greater than 15 microns is difficult to achieve in a high volume manufacturing environment.

The conventional method and apparatus for achieving greater workpiece placement accuracy with an industrial robot system has been to use two fixed cameras located over the workpiece placement location. The two fixed cameras identify a desired workpiece placement location by imaging the desired placement location and the industrial robot to provide feedback correction data. The benefits of this technique include the negation of inaccuracies caused by thermal cycling, e.g., warming and cooling, and the correction of inherent industrial robot movement inaccuracies.

The use of two fixed cameras located over a workpiece placement location does not provide sufficient accuracy when placing multiple workpieces in a densely populated electronic device. Specifically, the two fixed cameras cannot accurately view multiple chips over the length or width of the populated substrate, and therefore, lacks the ability to align multiple workpieces relative to one another. As such, high workpiece density electronic devices requiring workpiece placement accuracy better than 15 to 25 microns is burdensome and oftentimes requires manual labor intervention to ensure accurate workpiece placement.

SUMMARY OF THE INVENTION

The present invention addresses the above described problems associated with conventional reference position apparatus for industrial robot systems by increasing an industrial robot's workpiece placement accuracy to between about 5 microns and about 10 microns. This is accomplished by providing an imaging system sufficient to overcome inherent robot movement errors, as well as errors induced by the thermal cycling effects in a high volume manufacturing environment.

The system of the present invention includes a manipulator for moving the workpiece, an air bearing assembly, and an image referencing system disposed relative to the air bearing assembly for acquiring image data corresponding to the workpiece being moved by the manipulator. A workpiece source for housing a plurality of workpieces can also be provided.

According to one aspect, the image referencing system includes a plurality of image acquisition elements for acquiring image data corresponding to the workpiece. For example, the system can include a first image acquisition element for acquiring image data of a reference workpiece disposed on the substrate, and a second image acquisition element for acquiring image data of the workpiece being moved by the manipulator According to another aspect, the manipulator includes a controller for controlling movement thereof. A feedback connection can be provided between the image referencing system and the controller for controlling movement of the manipulator based on the acquired image data.

The present invention also provides for a system for moving a workpiece having an air bearing assembly, a manipulator for moving the workpiece, and an imaging referencing system coupled to the air bearing assembly and adapted for movement therealong for acquiring image data of the workpiece being moved by the manipulator.

According to one aspect, the imaging reference system comprises a first image acquisition element for acquiring image data of the workpiece being moved by the manipulator, and a second image acquisition element for acquiring position reference data. Specifically, the second image acquisition element can acquire data of a fixed target disposed on a base, where the data corresponds to the location of the manipulator.

According to another aspect, the manipulator includes a controller for controlling movement of the manipulator, and the system includes a feedback connection disposed between the imaging reference system and the manipulator for controlling movement of the manipulator based upon the image data acquired from the first and second image acquisition elements.

The present invention also provides for a system for moving a workpiece having an air bearing assembly, and a manipulator coupled to the air bearing assembly for moving the workpiece, where the manipulator includes a controller for controlling movement thereof, and first and second image acquisition elements for acquiring image data corresponding to the workpiece.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and are not to scale.

DETAILED DESCRIPTION OF THE INVENTION

Figure 1:
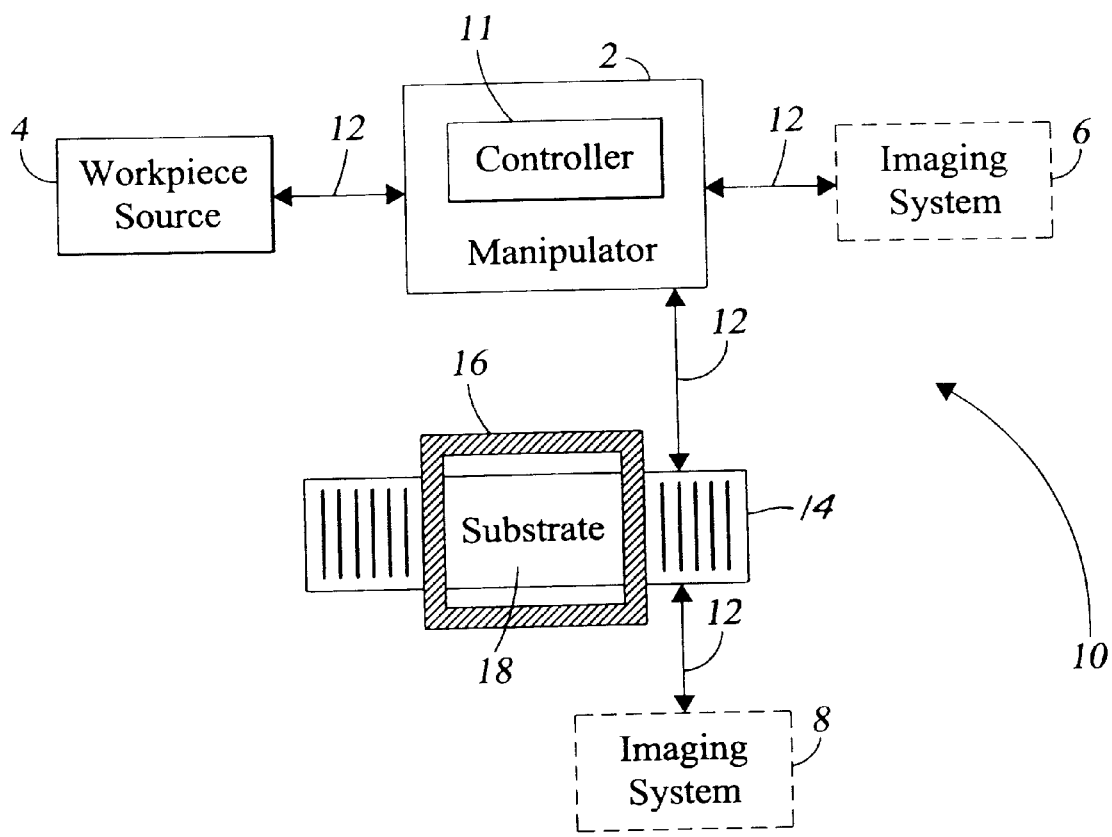
FIG. 1 is a schematic block diagram of an industrial robot system suitable for manufacturing components used in an image forming system having alternative imaging reference systems according to the teachings of the present invention.

The industrial robot system of the resent invention employs one or more imaging reference systems 6 and 8 to accurately place multiple workpieces in a high volume manufacturing environment. The various imaging reference systems may be combined in the industrial robot system 10 as a single imaging reference system, rather than as the two separate systems illustrated in FIG. 1. Alternatively, each of the below described imaging reference systems 6 and 8 may be independently coupled with the industrial robot system 10 to achieve greater workpiece placement accuracy. Specifically, the present invention is directed to a system 10 for increasing industrial robot workpiece placement accuracy. The system 10 can be configured as one or more image acquisition elements, such as a camera, mounted directly to the industrial robot, or configured as one or more cameras mounted at a fixed reference position. As is known in the art, a workpiece may be any passive or active electronic component in either a surface mount configuration or a plated throughhole configuration.

Generally, an industrial robot system is equipped with an imaging reference system to assist in the accurate placement of a selected workpiece onto a substrate or a printed wiring board (PWB). The imaging reference systems of conventional industrial robot systems provide insufficient workpiece placement accuracy when attempting to populate substrates having a high workpiece density. An example of a substrate having a high workpiece density includes a substrate containing one or more rows of LED's, such as a scan bar for use in electronic scanners, or a print bar for use in laser printers. While the current imaging reference systems utilized by the industrial robot system are helpful in increasing workpiece placement accuracy for the special case of a substrate having a single workpiece, this situation is a rare occurrence. Because most designs for electronic devices require that more than one workpiece be mounted to the substrate or PWB, the workpiece placement accuracy required by densely populated substrates is not easily obtainable. The present invention addresses this need by increasing the workpiece placement accuracy of an industrial robot system to a level suitable for manufacturing electronic designs having densely populated layouts, in high volumes, without the need for operator intervention.

The imaging reference system of the present invention provides a range of significant benefits to users of industrial robot systems in terms of workpiece placement accuracy and ease of implementation. The imaging reference systems can increase the workpiece placement accuracy of an industrial robot system without having to make significant hardware and software modifications to the existing industrial robot system. The imaging reference systems of the present invention are able to increase industrial robot system workpiece placement accuracy from a range between 25 microns and 50 microns, to a range between about 5 microns and about 10 microns.

FIG. 1 shows a schematic block diagram depiction of an industrial robot system 10 employing one or more image referencing systems 6 and 8. As illustrated, the industrial robot system 10 includes a manipulator device 2 having an electronic controller 11. The electronic controller 11 operates to control the movement of the manipulator device 2, and to coordinate the interaction of the various devices interfacing with the industrial robot system 10. The illustrated controller 11 communicates with the various industrial robot system 10 peripheral devices, such as workpiece source 4, imaging reference systems 6 and 8, and precision air bearing slide 14, via the communication links 12 to coordinate the interaction of the various industrial robot system devices. The communication links 12 can be any suitable interconnection for use in transmitting and/or receiving signals corresponding to instructions or data between one or more electronic devices. For example, the interconnection cable 12 can be electrical or optical cables, such as a parallel cable, a serial cable, a flex print, a fiber optic cable, and the like, or can represent a wireless connection.

According to one practice, the controller 11 directs the manipulator device 2 to retrieve a component from the workpiece source 4. The workpiece source 4 can include a tray compartment holding a desired workpiece. The compartmentalized tray may be a waffle pack or other similar tray assembly suitable for holding a workpiece in support of a pick and place operation. The workpiece source 4 can signal the controller 11 to halt the manipulator device 2 when workpiece source 4 is out of workpieces or during a workpiece replenishment operation. Those of ordinary skill in the art will readily recognize that the workpiece source 4 can include an automated material handler apparatus, which may be a magazine type material handler, a lead frame magazine type handler, or a waffle tray type material handler. The interaction of the manipulator device 2 with the imaging reference system 6, the imaging reference system 8, and the precision air bearing slide 14 will be described in more detail below. The workpiece is adapted to be used in any suitable system, such as an image forming system. An image forming system can include different technologies, such as electrophotographic, electrostatic, electrostatographic, ionographic, acoustic, and inkjets, such as a thermal inkjet, piezo inkjet, and micromechanical inkjet, and other types of image forming or reproducing systems that are adapted to capture and/or store image data associated with a particular object, such as a document, and reproduce, form, or produce an image.

One skilled in the art will recognize that the controller 11 may be any commercially available industrial controller suitable for providing motion control of a robotic arm assembly. Such a controller may be a next generation robot controller or XRC controller manufactured by Motoman, Inc. of West Carrolton Ohio.

Figure 2:
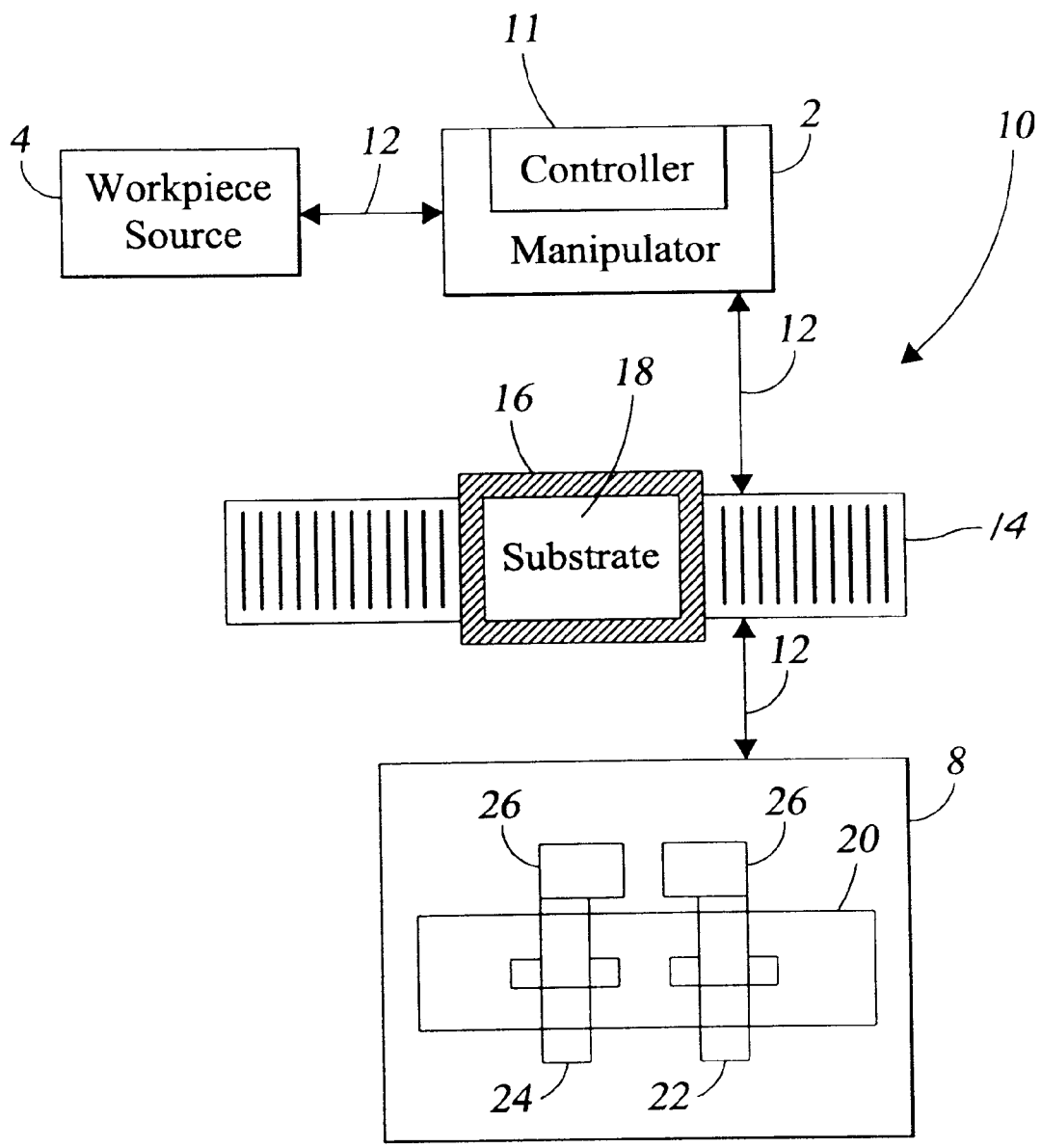
FIG. 2 is a schematic diagram of the industrial robot system of FIG. 1 where the reference position system includes a precision slide assembly according to the teachings of the present invention.

FIG. 2 illustrates one embodiment of the industrial robot system 10 of the present invention. The robot system 10 includes a single imaging reference system 8, which operates in conjunction with the precision air bearing slide assembly 14 and the manipulator device 2 to increase workpiece placement accuracy. The imaging reference system 8 through the communication links 12 provide the necessary reference feedback information to the controller 11 in order to direct the movement of the manipulator device 2 and the substrate holder 16 on the precision air bearing slide device 14. In this manner, the controller 11 is able to direct the movement of the manipulator device 2 and the movement of the substrate holder 16 on the air bearing slide 14 to realize a workpiece placement accuracy of between about 5 microns and about 10 microns. The imaging reference system 8 includes a first fixed image acquisition device 22 and a second fixed image acquisition device 24 mounted to a camera base 20. The term image acquisition device as used herein is intended to include any device suitable for capturing or acquiring image data. Examples of suitable image acquisition devices include cameras, such as a video camera that records at a video frame rate (i.e. 30 frames per second), monochrome camera, color camera, CCD camera, and other like. The term camera is used hereafter for the sake of simplicity.

The first fixed camera 22 and the second fixed camera 24 are each coupled to an optical assembly 26, such as an optical prism assembly. The optical assembly is disposed relative to the cameras 22 and 24 for imaging workpiece fiducials located on the topsides of a selected workpiece.

In operation, the manipulator device 2 retrieves a workpiece from the workpiece source 4 and moves the workpiece to a position within the field of vision of the first camera 22 and the second camera 24. The first camera 22 and the second camera 24 acquire image data corresponding to the retrieved workpiece to identify the workpiece type. The cameras also capture information corresponding to the current workpiece orientation on the manipulator device 2. This information is transferred or conveyed to the controller 11. The controller 11, based on the imaging feedback information, generates an output signal for moving the workpiece holder 16 along the air bearing slide 14 to the proper location to align the substrate 18 disposed thereon with the retrieved workpiece. Specifically, the manipulator device 2 and/or the workpiece holder 16 are moved in order to place a workpiece retrieved from the source 4 on the substrate with a high degree of accuracy.

When the workpiece holder 16 is disposed at the proper location along the air bearing slide 14, the first camera 22 and the second camera 24 capture image data corresponding to the workpieces placed on the substrate 18 by the manipulator device to provide additional reference information to the controller 11. As a result, the controller 11 calculates any X-Y coordinate errors, and any Theta orientation errors for the retrieved workpiece and generates signals to move the manipulator and/or holder 16 to adjust the position or location of the workpiece relative to the substrate.

The illustrated imaging reference system 8 acquires information regarding the position or location of the workpiece, and transfers this information to the controller 11 to assist the manipulator device 2 in placing and orienting multiple workpieces on the substrate 18. With the assistance of imaging reference system 8, the manipulation device 2 operates with a workpiece placement accuracy of between about 5 microns and about 10 microns. Since imaging reference system 8 utilizes already placed workpieces on substrate 18 to guide the placement of the next selected workpiece, the imaging reference system 8 is able to provide imaging feedback data regarding the selected workpiece's x-axis orientation, y-axis orientation and theta orientation relative to already placed workpieces.

Figure 3:
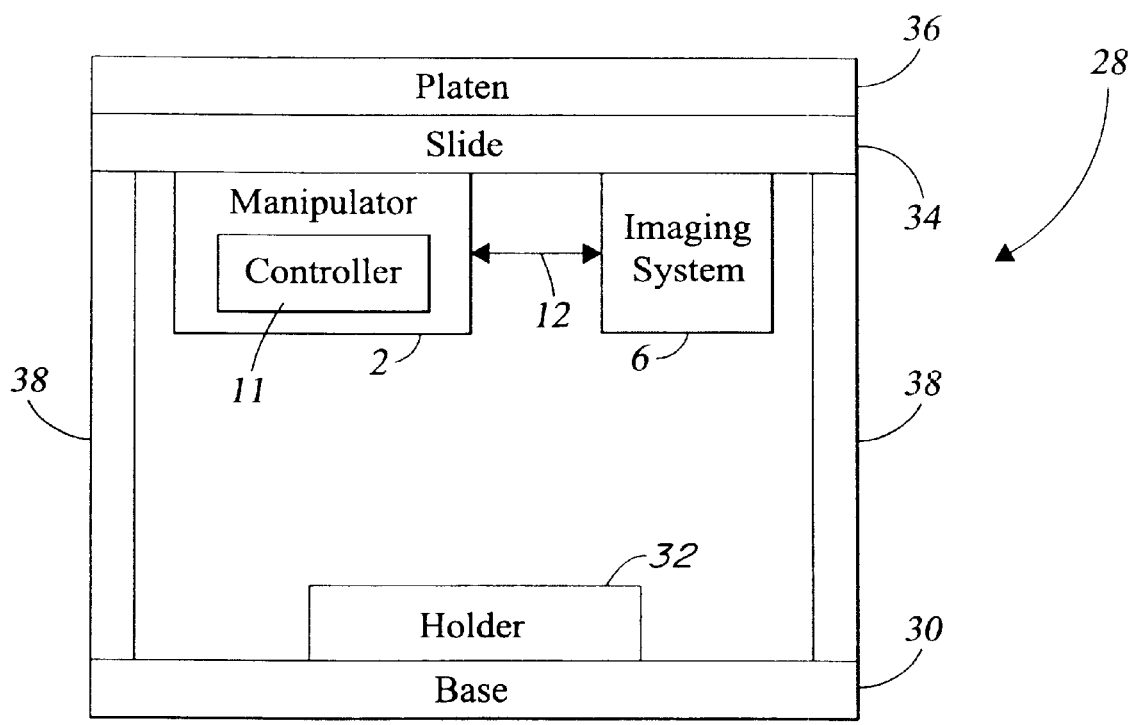
FIG. 3 is a schematic diagram of an industrial workcell housing the industrial robot system of the invention.

As illustrated in FIG. 3, the industrial robot system 10 may be housed in a modular workcell 28. The modular workcell 28 includes a fixed base 30 to support the two vertical support members 38. A first end of the vertical support member 38 is coupled to the base 30 and a second end of the vertical support member 38 is coupled to the bottom side of an air bearing slide assembly 34. The slide assembly can be similar to the assembly 14 in FIG. 1. Also coupled to bottom side of the air bearing slide 34 are the manipulator device 2 and the imaging reference system 6. A platen 36 is coupled to the topside of the air bearing slide 34.

The illustrated air bearing slide 34 allows the manipulator device 2 and the imaging reference system 6 to move in the X-Y direction above the base 30. In this manner, the imaging reference system 6 is capable of performing a vertically aligning a workpiece on the workpiece holder 32. This arrangement increases the workpiece placement accuracy of the manipulator device 2 to between about 1 micron and about 3 microns. The operation of imaging reference system 6 in conjunction with the manipulator device 2 will be discussed in more detail below.

Figure 4:
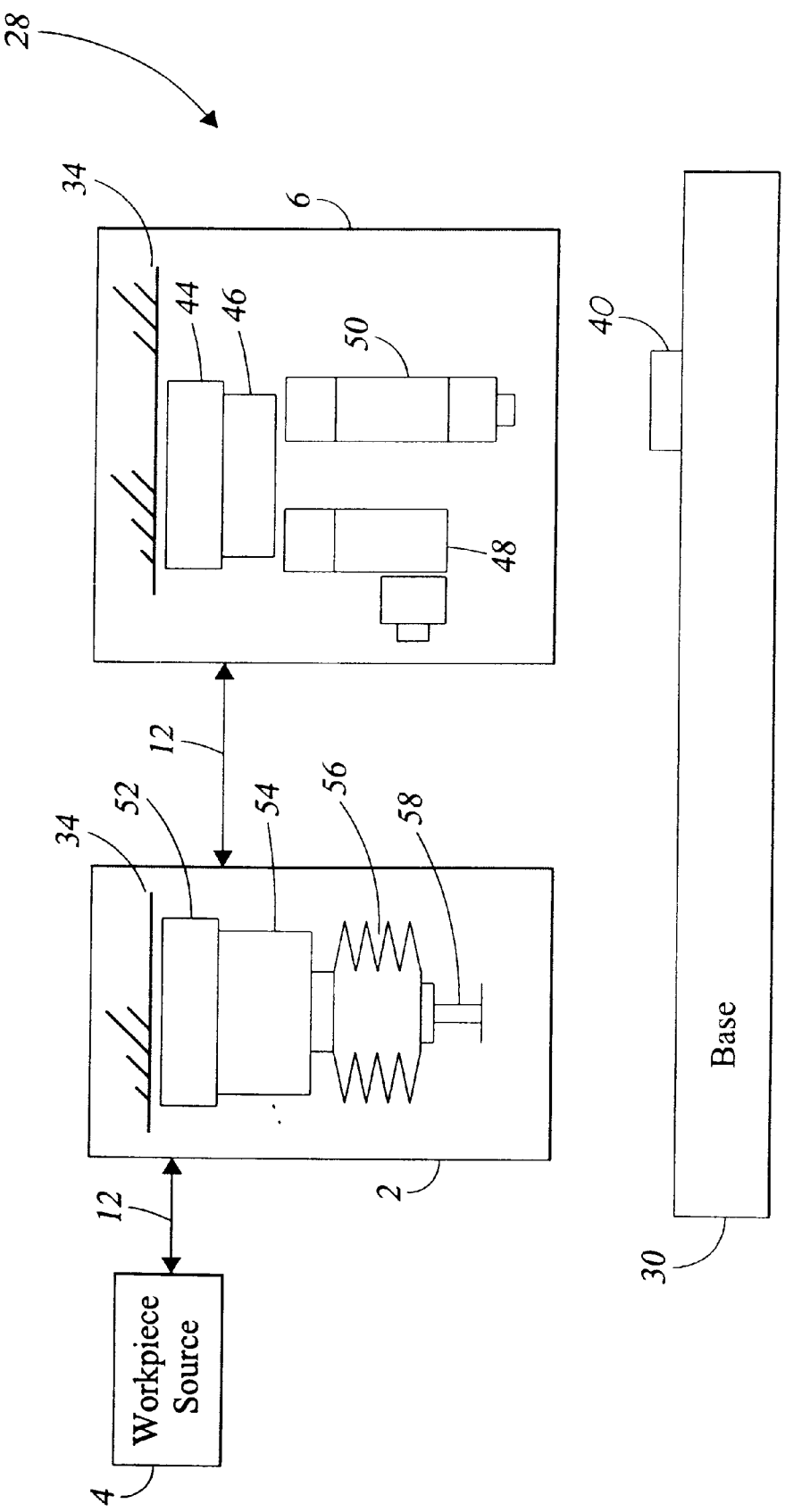
FIG. 4 is a schematic diagram showing an alternative imaging reference system according to the teachings of the present invention.

As illustrated in FIG. 4, the manipulator device 2 includes a manipulator base 52 coupled to the bottom side of the air slide assembly 34. The manipulator base 52 allows the manipulator device 2 to move in X-Y coordinates along the air bearing slide 34. The manipulator rotary coupling 54 is coupled to the bottom side of the manipulator base 52, and terminates in a first end portion of a manipulator arm assembly 56. The manipulator rotary coupling 54 allows the manipulator arm assembly 56 to rotate about the Z-axis of the air bearing assembly 34. The manipulator arm assembly 56 can be extended downward toward the base 30 in the Z-axis to retrieve a workpiece from the workpiece source 4 and to place the selected workpiece onto the holder 32 or substrate 18. Coupled to the second end portion of the manipulator arm assembly 56 is a vacuum device 58.

The imaging reference system 6, like the manipulator device 2, moves in an X-Y direction along the bottom side of the air bearing assembly 34. The illustrated imaging system 6 includes a base 44 that is coupled to the bottom side of the air bearing assembly 34, while having a second side that is coupled to an imaging system rotary coupling 46. The bottom side of the imaging system rotary coupling 46 is coupled to a first camera 48 and a second camera 50. The imaging system rotary coupling 46 allows the first camera 48 and the second camera 50 to rotate about the Z-axis of the air bearing assembly 34.

The dual camera setup illustrated in the imaging reference system 6 is configured so that the second camera 50 focuses downwardly at a fixed target 40 on the base member 30. The fixed target 40 acts to provide the controller 11, through the imaging reference system 6, the X-Y coordinate information necessary to determine an accurate X-Y coordinate for the manipulator device 2. The first camera 48 of the reference imaging system 6 can be a right angle camera configured to image the workpiece retrieved by the manipulator device 2.

In operation, the first camera 48 acquires or captures information about the location or position of the retrieved workpiece. This information is conveyed to the controller 11 of the manipulator device 2 to orient and identify the workpiece, and to correct for X-Y coordinate movement errors in the manipulator device 2 and to correct for workpiece Theta orientation. The controller 11 corrects the workpiece Theta orientation by directing the manipulator rotary coupling 54 to rotate the manipulator arm assembly 56 until orientation for the selected workpiece is corrected. Moreover, the first camera 48 may utilize fiducials built into the workpiece to assist in providing workpiece orientation feedback to the controller 11.

Once the manipulator device 2 has retrieved a workpiece from the workpiece source 4, the manipulator device 2 moves the workpiece to the proper location on the substrate 18. When the manipulator device 2 reaches the proper location, the imaging reference system 6 moves along the air bearing assembly 34 until the second camera 50 is aligned with the fixed target 40. Once the second camera 50 and the fixed target 40 are optically aligned, the controller 11, using the imaging feedback data from the second camera 50, calculates the coordinate position and if desired any associated position or orientation errors of the retrieved workpiece. The controller 11 generates an output signal to move the manipulator device 2 to make the appropriate X-Y coordinate adjustments if an X-Y position error is detected. When the manipulator device 2 completes any directed X-Y coordinate adjustments, the controller 11, using feedback data from the imaging reference system 6, determine the appropriate X-Y coordinate adjustment or position data that is necessary for the manipulator device 2 to move the workpiece.

When the manipulator device 2 is correctly aligned to place the retrieved workpiece on the holder 32 or the substrate 18, the first camera 48 again captures image data of the retrieved workpiece and verifies that the workpiece orientation is correct. If the orientation of the retrieved workpiece is incorrect, the controller 11 is able to rotate the manipulator arm assembly 56 to correct for any Theta orientation errors until the correct workpiece Theta orientation is achieved. Once the controller 11 confirms the correct orientation of the retrieved workpiece and the correct X-Y coordinates for the manipulator device 2, the controller 11 generates signals such that the manipulator assembly arm 56 moves downwardly in the Z-axis to place the retrieved workpiece on the substrate 18.

Those of ordinary skill in the art will readily recognize that the base 30 may have more than one fixed target 40 to assist in the placement of a workpiece on the substrate 18. The fixed target 40 may be a fiducial located on a tooling fixture, tooling jig, tooling holder, or the like, for providing a necessary reference target for the imaging reference system.

The use of two mobile cameras as illustrated in the imaging reference system 6 reduces the need for additional fixed cameras without sacrificing workpiece placement accuracy in the industrial robot system 10. The reference imaging feedback data acquired by the imaging reference system 6 is able to increase the workpiece placement accuracy of the manipulator device 2 to between about 1 micron and about 3 microns. Moreover, the second camera 50 may include an optical prism device so as to employ a fixed target located at one or more locations in the X or Y axis of the industrial robot system 10.

Figure 5:
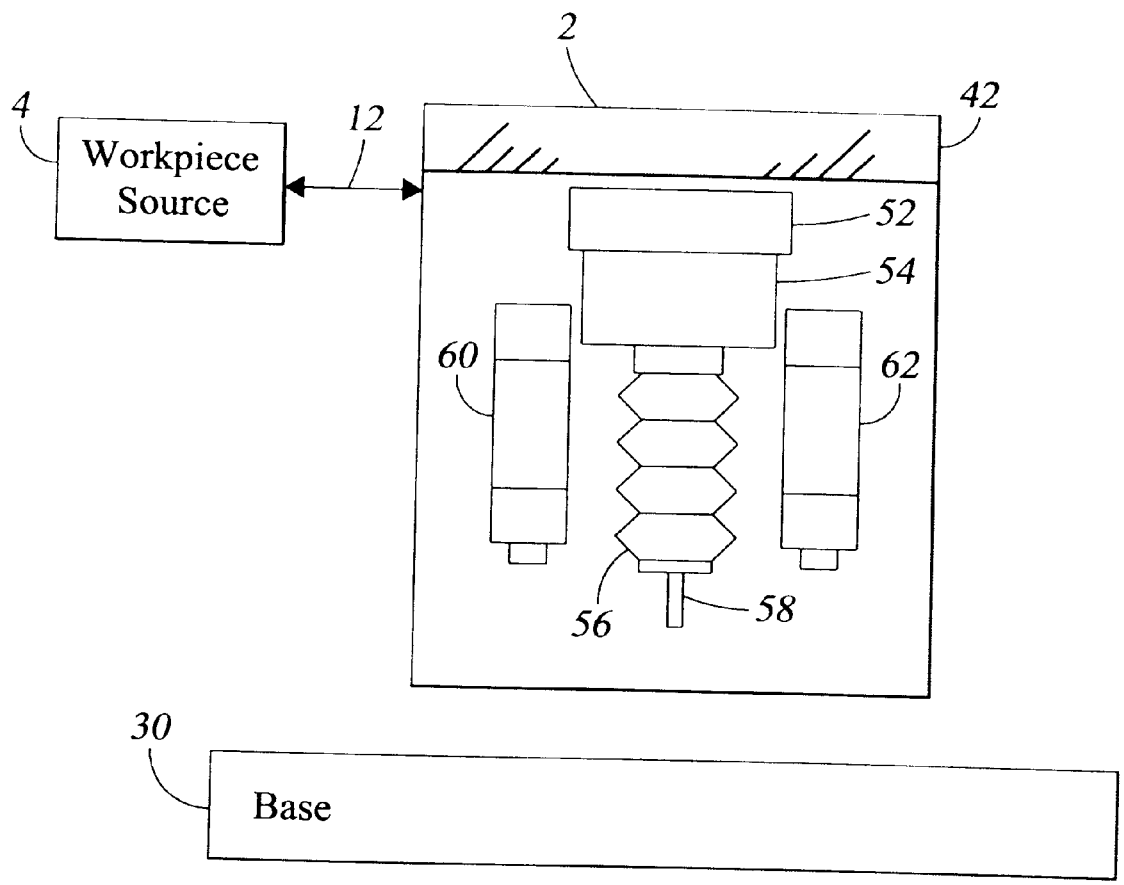
FIG. 5 is a schematic diagram showing an alternative imaging reference system according to the teachings of the present invention.

FIG. 5 illustrates an alternate embodiment of the manipulator device 2 of the present invention. Like reference numerals designate like parts throughout the different FIGURES. The illustrated manipulator device includes a first camera 60 and a second camera 62 attached to the manipulator rotary coupling 54. In this configuration, the manipulator device 2 has on board reference imaging capability for identifying and orienting the workpiece. In this manner, the first camera 60 can capture image data of the workpiece attached to the vacuum nose 58. As a result, the system can track the workpiece from the workpiece source 4 to the manipulator device, and during placement on the base 30. Specifically, the system 10 determines the workpiece orientation and location with the cameras 60 and 62. The second camera 62 is a reference camera that provides reference data for the system. This is accomplished by affixing a fiducial to the base, and then obtaining image data corresponding to the fiducial. One of ordinary skill in the art will readily recognize that the second camera 62 may also utilize a fiducial affixed to the substrate 18, the base member 30, or other suitable location for affixing a reference fiducial.

In operation, the manipulator device 2 retrieves a workpiece from the workpiece source 4 and moves to the retrieved workpiece to the workpiece placement location on the substrate 18. When the manipulator device 2 reaches the workpiece placement location, the second camera 62 optically aligns the manipulator device 2 with a fixed target. The fixed target may be a fiducial in the substrate itself, a fiducial on the base member 30, or a fiducial on the workpiece holder 16. Once the second camera 62 is aligned with the reference target, the controller 11 using image feedback data acquired from the second camera 62 determines the location of the workpiece, and if desired calculates any X and Y position errors. If the position errors exist, the controller 11 directs the movement of the manipulator device 2 to correct for the calculated errors. Before the manipulator device 2 places the retrieved workpiece onto substrate 18, the second camera 62 again acquires image data associated with the fixed target to confirm that the last directed movement of the manipulator device 2 corrected any X-Y position errors. If the controller 11 confirms proper movement, the first camera 60 again images the retrieved workpiece. If the controller 11 confirms proper workpiece orientation, the controller 11 extends the manipulator arm assembly 54 downwardly in the Z axis to place the retrieved workpiece on substrate 18.

The use of two fixed cameras mounted to the manipulator device 2 results in a workpiece placement accuracy of between about 2 microns and about 5 microns. Additionally, a cycle time reduction in workpiece placement may be realized, because proper workpiece orientation may be verified and adjusted as the manipulator device 2 is moved to a position or location above the substrate 18.

Those skilled in the art will appreciate that the applications of the imaging reference systems are not limited solely to the placement of workpieces on a substrate. For example, the imaging reference systems may be utilized with wire bonding systems, wafer probe systems, and the like.

While the present invention has been described with reference to an illustrative embodiment thereof, those skilled in the art will appreciate that various changes in form and detail may be made without departing from the intended scope of the present invention as defined in the appended claims.

What is claimed is:

1. A system for placing a workpiece on a substrate for subsequent use in an image forming system, comprising:
   a manipulator for moving the workpiece,
   an air bearing assembly including a movable workpiece holder adapted for translational movement along the air bearing assembly, and
   an image referencing system disposed relative to the air bearing assembly for acquiring image data corresponding to the workpiece being moved by the manipulator.

2. The system of claim 1, further comprising a workpiece source for housing a plurality of workpieces.

3. The system of claim 1, wherein the image referencing system comprises a plurality of image acquisition elements for acquiring image data corresponding to the workpiece.

4. The system of claim 1, wherein the image referencing system comprises a first image acquisition element for acquiring image data of a reference workpiece disposed on the substrate, a second image acquisition element for acquiring image data of the workpiece being moved by the manipulator.

5. The system of claim 1, wherein the manipulator comprises a controller for controlling movement thereof.

6. The system of claim 5, further comprising a feedback connection between the image referencing system and the controller for controlling movement of the manipulator based on the acquired image data.

7. A system for moving a workpiece, comprising:
   an air bearing assembly,
   a manipulator, coupled to the air bearing assembly and adapted for movement therealong, for moving the workpiece, and
   an imaging referencing system coupled to the air bearing assembly and adapted for movement therealong for acquiring image data of the workpiece being moved by the manipulator.

8. The system of claim 7, wherein said manipulator comprises:
   a base portion coupled to the air bearing assembly and adapted for translational movement therealong, a rotary member coupled to the base portion for allowing the manipulator to rotate, and an arm member coupled to the rotary member for selectively moving the workpiece.

9. The system of claim 7, wherein said imaging reference system comprises a first image acquisition element for acquiring image data of the workpiece being moved by the manipulator, and a second image acquisition element for acquiring position reference data.

10. The system of claim 9, wherein said second image acquisition element acquires data of a fixed target disposed on a base, said data corresponding to the location of the manipulator.

11. The system of claim 9, wherein said manipulator comprises a controller for controlling movement of the manipulator, said system further comprising a feedback connection disposed between the imaging reference system and the manipulator for controlling movement of the manipulator based upon the image data acquired from the first and second image acquisition elements.

12. The system of claim 11, wherein said second image acquisition element acquires reference data of a fixed target disposed on a base, and wherein said controller determines the position of the manipulator based upon said reference data.

13. A system for moving a workpiece, comprising:

an air bearing assembly, and a manipulator coupled to the air bearing assembly for moving the workpiece, said manipulator including a controller for controlling movement thereof, and first and second image acquisition elements for acquiring image data corresponding to the workpiece.

14. The system of claim 13, wherein said controller determines the location and orientation of the workpiece handled by the manipulator from said image data acquired by said first and second image acquisition elements.

15. The system of claim 13, wherein said manipulator further comprises:

a base portion coupled to the air bearing assembly and adapted for translational movement therealong, a rotary member coupled to the base portion, an arm member coupled to the rotary member, and a wrist portion coupled to the arm member for selectively moving the workpiece.

* * * * *